United States Patent [19]

David

[11] Patent Number: 4,699,359
[45] Date of Patent: Oct. 13, 1987

[54] SHUT-OFF VALVE

[75] Inventor: Walfried David, Maxdorf, Fed. Rep. of Germany

[73] Assignee: Bopp & Reuther GmbH, Mannheim, Fed. Rep. of Germany

[21] Appl. No.: 762,775

[22] Filed: Aug. 5, 1985

[30] Foreign Application Priority Data

Aug. 3, 1984 [DE] Fed. Rep. of Germany ....... 3428636
Nov. 6, 1984 [DE] Fed. Rep. of Germany ....... 3440464

[51] Int. Cl.$^4$ ............................................... F16K 3/30
[52] U.S. Cl. ................................... 251/329; 220/243; 251/270; 251/368
[58] Field of Search ............... 251/329, 368, 326, 327, 251/270, 274; 220/3, 243, 251, 328

[56] References Cited

U.S. PATENT DOCUMENTS

| 1,662,279 | 3/1928 | Parker | 220/243 |
| 1,783,129 | 11/1930 | Moses et al. | 220/243 |
| 2,527,949 | 10/1950 | Maier et al. | 220/243 X |
| 2,541,968 | 2/1951 | Laurent | 251/270 X |
| 2,954,960 | 10/1960 | Dunbar et al. | 251/328 X |
| 3,857,546 | 12/1974 | Quirk | 251/368 X |
| 4,313,593 | 2/1982 | Lambie | 251/327 |
| 4,431,163 | 2/1984 | Barbe | 251/367 |

FOREIGN PATENT DOCUMENTS 3141416 10/1981 Fed. Rep. of Germany .

Primary Examiner—Martin P. Schwadron
Assistant Examiner—Stephen M. Hepperle
Attorney, Agent, or Firm—Michael J. Striker

[57] ABSTRACT

A shut-off valve has a housing, a wedge displaceable in the housing by a spindle, a housing opening, a cover arranged to close the housing opening and provided with a pipe, a locking screw inserted in the pipe for guiding, sealing and abutting of the spindle, and a supporting ring arranged between an outer end face of the cover pipe and an aligned collar of the screw and provided with two opposite supporting legs which abut with their lower supporting surfaces from above against a housing edge region which is adjacent to the cover pipe, so that during tightening of the locking screw which clamps the spindle collar and outwardly seals the spindle, simultaneously the cover is fixedly clamped with the housing.

14 Claims, 8 Drawing Figures

SHUT-OFF VALVE

BACKGROUND OF THE INVENTION

The present invention relates to a shut-off valve which has a valve housing with a shutting wedge displaceable in the housing by a spindle transversely to a flow direction, a cover which closes an oval-like housing opening and has a sealing edge engaging with the housing edge and an outwardly extending pipe, and a locking screw arranged in the pipe and forming a spindle guide, a spindle sealing and a support for a spindle collar.

When a shut-off valve is provided with such a cover closure, it is no longer necessary to have flange connecting screws required for a flange housing hood, and the cover is loaded with a medium pressure by a sealing edge which engages from inside the curved housing edge, so that it is retained in its sealing condition. Since the cover is formed by engagement with the housing edge larger than the upper housing opening, it is tilted during mounting by at least 90° and then in a certain inclined position is inserted friom above through the oval housing opening into the housing. After the turning of the cover to its mounting position it must be lifted to its abutment against the housing edge and then fixedly clamped with the housing.

The German Pat. No. 3,141,416 discloses a shut-off valve with the above described cover which abuts from inside against the housing edge. After insertion of the cover for further mounting the non-lifted spindle is first introduced into the housing and its threaded part is screwed into the shutting body. The locking screw must be screwed into the pipe of the cover until its abutment against the spindle collar. Then the threaded spindle is pulled back by actuation of the spindle head until after abutment of the shutting body against the housing seat the cover with the pipe and the locking screw is lifted and finally pressed to its clamping position with deformation of the cover sealing ring. In this position vertical semi-cylindrical grooves in the cover and in the housing edge form several hollow cylinders at both sides of the cover, and cylindrical pins which form locking elements for the cover are inserted into the hollow cylinders and secured against falling out by securing elements.

In the above mentioned known shut-off valve, the locking screw for mounting of the cover must be completely screwed-in and the spindle must be first screwed in and again screwed back, and high spindle forces are required for pressing the cover against the housing edge. Also, the insertion of the different locking pins into the hollow cylinder is time consuming so that mounting and locking of the cover in the housing head is expensive. Moreover, unloading of the cover seal after loosening of the spindle by the available play of the locking pins is unavoidable, so that untightness of the cover can take place.

SUMMARY OF THE INVENTION

Accordingly, it is an object of the present invention to provide a shut-off valve which avoids the disadvantages of the prior art.

Moreover particularly, it is an object of the present invention to provide a shut-off valve which considerably simplifies insertion of the cover and its clamping with the housing edge, as well as mounting of the remaining parts.

In keeping with these objects and with others which will become apparent herein after, one feature of the present invention resides, briefly stated, in a shut-off valve in which a supporting ring is arranged between a pipe of the cover and a locking screw and provided with two supporting legs which rest with their lower supporting surfaces from above on the housing edge, and during tightening of the locking screw which clamps a spindle collar and outwardly seals a spindle the cover is simultaneously firmly clamped with the housing.

In this construction no separate clamping of the cover with the housing edge is needed and introduction of locking members and securing members after the clamping step is dispensed with. Moreover during turning-in of the locking screw into the inner thread of the cover pipe the cover is lifted in one working step until abutment against the inner surface of the housing edge and the spindle is clamped against the spindle collar. When the locking screw is firmly pulled, there is provided thereby both the spindle sealing between the cover pipe and the locking screw by compression of the sealing ring inserted in the cover pipe, and also the cover sealing against the housing edge by pressing of the cover edge against the inserted cover sealing ring. This elastic clamping condition of the spindle sealing and the cover sealing is maintained by self-locking of the closing screw connection over a long time and no springing back of the cover sealing ring can take place.

In accordance with another advantageous feature of the present invention the pipe of the cover has an outer diameter which substantially corresponds to the width of the housing opening required for the shutting wedge in its narrow location, and the locking screw is provided inside with a projection for abutting of the spindle collar and outside with an outer thread extending over its entire height. In the increased cross-section of the pipe the thread required for clamping extends over the height of the pipe, and the receiving chamber for supporting the spindle collar lies no longer under the locking screw, but instead concentrically to the thread in the interior of the locking screw. By this adjacent arrangement of the thread and the receiving chamber for the spindle collar, the cover pipe because of the sufficient thread length can have a considerably reduced height. Thereby the housing cover with the pipe can be introduced into a narrow housing opening in a 90°-tilted position, so that the housing can be formed with a smaller cross-section. The shorter pipe simultaneously reduces also the height of the shutting member and moreover because of the increase of the pipe it is provided that the supporting ring arranged on the pipe has also a greater diameter, so that the downwardly extending supporting legs can support on the housing edge over substantially larger surfaces.

In accordance with still another feature of the present invention the cover pipe is provided with outwardly extending holding cams so that the cover inserted into the housing can be held by turning-in of the supporting ring in the supporting position by guiding strips of the supporting legs in a position ready for mounting, before the remaining parts of the shut-off valve and particularly the threaded spindle and the locking screw are screwed-in. The end of the supporting legs abut in the supporting position completely on the housing edge and engage with their guiding strips with mounting holding cams of the pipe, so that the housing cover is carried reliably and the user has free hands for displacing the threaded spindle through the pipe and screwing into the spindle nut of the shutting wedge, and finally turning-in the locking screw into the inner thread of the cover pipe. The mounting of the shut-off valve is thereby considerably facilitated.

A further feature of the present invention is that the supporting legs are provided at the end of the guiding path with a holding abutment and thereby during mounting of the cover they cannot be turned out of the region of the holding cams of the pipe, and the cover is provided in the region of the holding abutment with projections which prevent rotation of the supporting legs and engage the supporting surfaces of the supporting legs.

A similar mounting feature with the same advantages is provided when the pipe has two holding cams arranged off-centrally at the same side and engaged by holding hooks of both supporting legs during lateral displacement of the supporting ring to the supporting position. The locking of the lifted cover pipe is performed here not by rotation, but instead by lateral displacement of the supporting ring to the supporting position. With this construction of the supporting legs and holding cams, it is easy to achieve a central placement of the supporting legs onto the housing edge at the narrow location of the housing opening.

For simplifying the casting mold for the cover with the supports, the mounting elements instead of the outwardly projecting holding cams can be formed as one or two diametrically opposite outer longitudinal ribs which are circumferentially offset relative to the narrow location of the housing opening and extend over the entire height of the cover pipe, so as to form a rotary abutment for the supporting legs of the supporting ring against the cover pipe. The supporting legs are provided with arresting projections which during mounting engage in arresting projections of the housing edge or the cover. With these mounting elements, in contrast to the above described mounting elements, the outer longitudinal ribs can be cast without additional casting core and the guiding strips on the supporting legs can be dispensed with, whereby low additional expenditures during the mounting do not take place.

With these mounting elements, after insertion of the shutting wedge the cover with the pipe is inserted into the interior of the housing and then the supporting ring is introduced into the housing so that the supporting legs lie in the greater axis of the oval housing opening and extend through the housing opening. Then the threaded spindle is turned-in and the locking screw is screwed-in with several thread convolutions into the cover pipe. Now the locking screw together with all other suspended parts is lifted so that the supporting ring can be turned by 90° until abutment of the supporting legs against the outer longitudinal ribs of the pipe. In this position the supporting legs lie centrally to the small oval axis of the housing opening and engage with their lower supporting surfaces the housing edge, so that during final lowering of the locking screw all parts are suspended via the supporting legs of the supporting ring on the housing edge. The arresting projections on the supporting legs penetrate into the arresting projections of the housing edge or the cover, so that the supporting ring is no longer turnable and the housing parts during turning-in of the locking screw to the clamping position are reliably supported by the supporting ring. Holding of the housing parts by hand or by other auxiliary means is no longer necessary.

In accordance with a further embodiment of the invention, the supporting legs of the supporting ring have arcuate large-surface cross-section, and the housing edge carries in the abutment region of both supporting legs, further flat projection having large surfaces. Thereby both supporting legs lie with the greater cross-section tightly on the further projections of the housing edge and guarantee a reliable support during clamping of the housing cover, in other words during tightening of the locking screw which is screwed into the cover pipe. Because of the large surface cross-section, the supporting legs with the supporting ring are formed extraordinarily stable and can be produced, similarly to the housing and to the cover with pipe, from casting iron.

The sealing edge of the cover which engages with the housing edge can be provided with a projection which forms, together with a projection of the housing edge having an incline, a continuous closed sealing chamber for an elastic sealing ring. Thereby the width of the inwardly extending housing edge required for supporting the sealing ring and therefore the cross-section of the housing can be reduced, and the cover obtains a tight position centering during clamping with the housing by the sealing ring abutting against the inner incline of the housing edge.

The sealing ring can be formed as a standing sealing band with two edge beads, and the sealing edge of the cover can carry an abutment strip abutting against the housing edge. Thereby both sealing beads during clamping of the cover can be deformed over the incline of the sealing ring chamber inwardly and provide a reliable sealing of the housing cover. The abutment strip abutting against the housing edge provides a metallic abutment which presents overloading or squeezing of the elastic sealing band.

The housing opening and the inner chamber of the housing can be used better for insertion and turning of the cover when the pipe with the bottom of the cover is offset in direction of curving of the sealing ring toward the housing. By pulling of the pipe in the region of curving of the cover, the mounting size of the cover extending from the lower edge of the curving to the upper edge of the pipe can be further reduced so that smaller space is required for the cover mounting.

The locking screw can be provided with a wear resistant synthetic plastic layer having high sliding properties and produced by spraying or depositing such as coating with a roller. In this construction a metallic sliding pair between the locking screw and the threaded spindle or the spindle collar is eliminated. In a simple manner a synthetic plastic sliding layer inwardly connected with the locking screw is provided, which can reliably take up the guiding forces and the spindle forces transferred through the spindle collar. The synthetic plastic layer can also be provided in the spindle guiding region with the annular grooves, and spindle sealing rings can be accommodated in these annular grooves.

The novel features which are considered as characteristic for the invention are set forth in particular in the appended claims. The invention itself, however, both as to its construction and its method of operation, together with additional objects and advantages thereof, will be best understood from the following description of spe-

DESCRIPTION OF PREFERRED EMBODIMENTS

Figure 1:
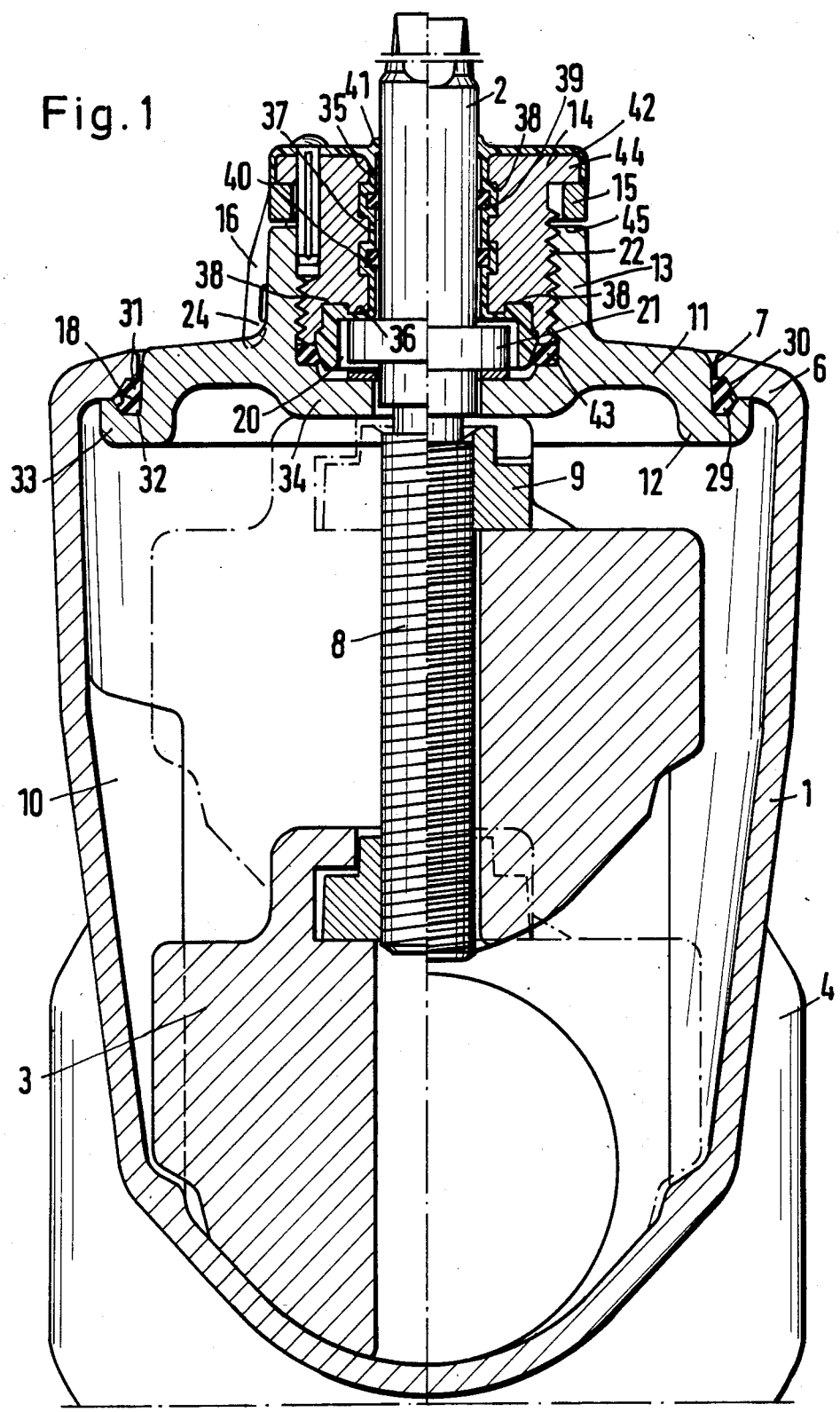
FIG. 1 is a view showing a shut-off valve in accordance with the present invention with a cover which engages a housing edge and with a supporting ring, in a section taken along the line I—I in FIG. 3.
Figure 2:
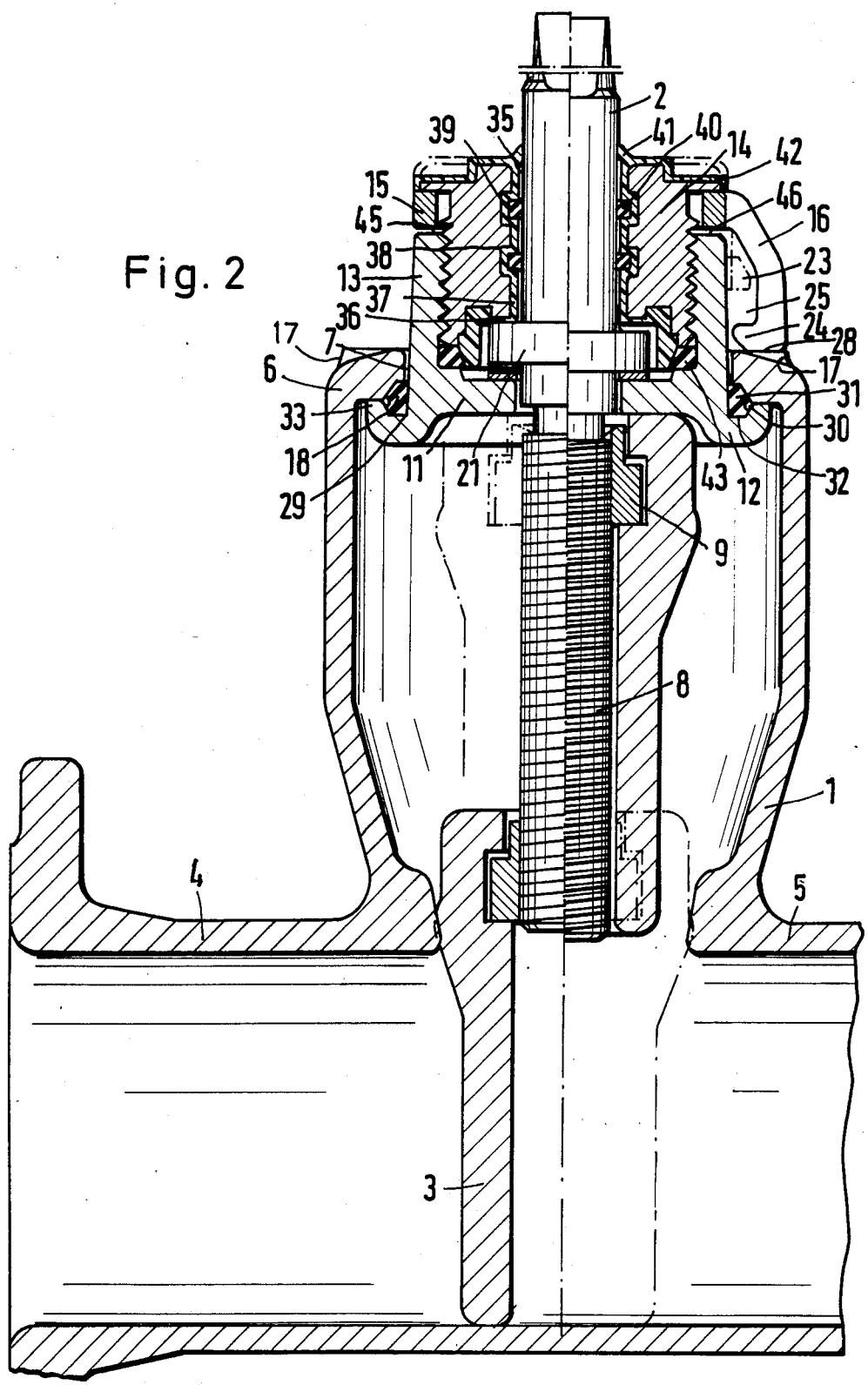
FIG. 2 is a view showing the shut-off valve of FIG. 1 in a section taken along the line II—II in FIG. 3.
Figure 3:
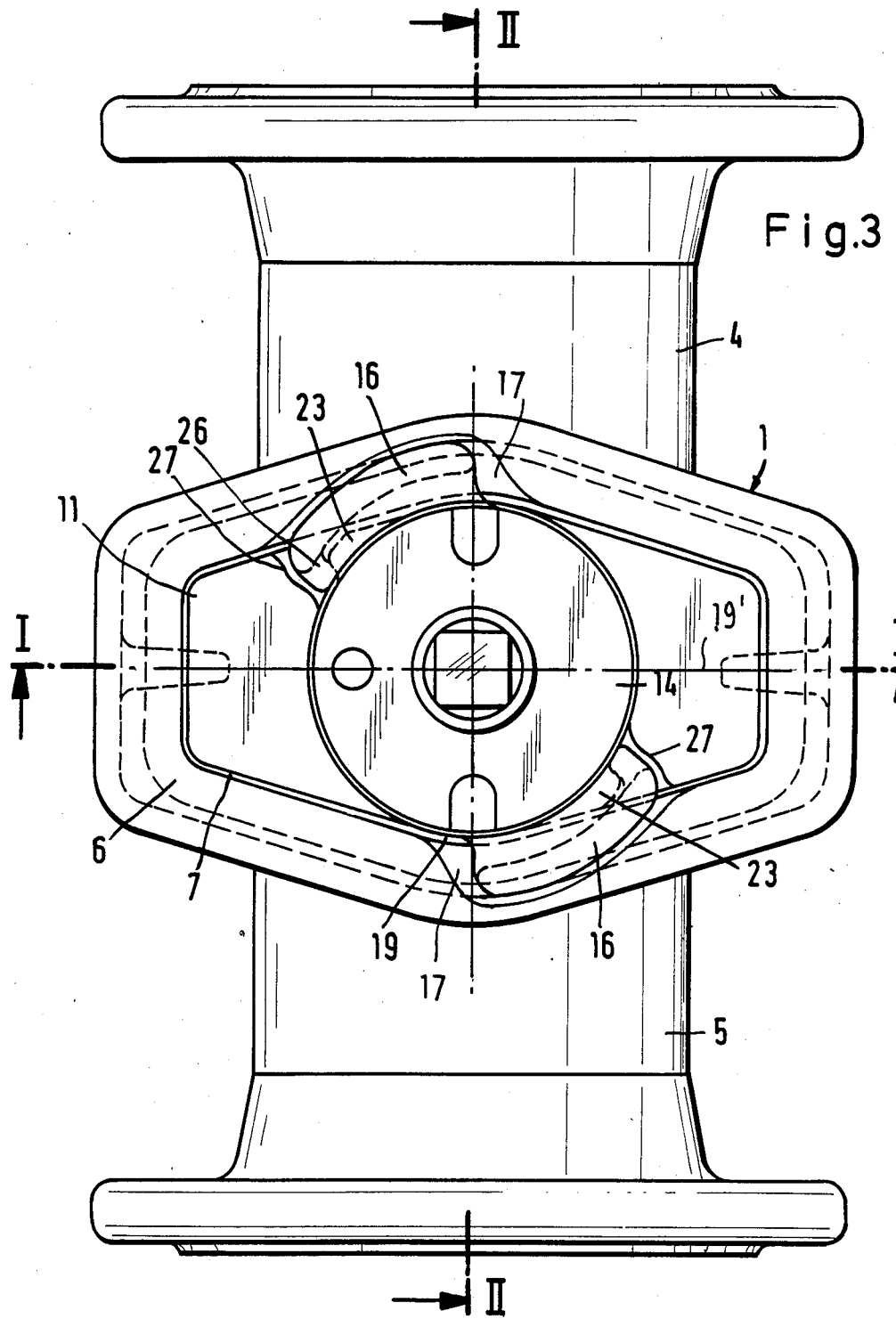
FIG. 3 is a plan view of the shut-off valve shown in FIGS. 1 and 2.

A shut-off valve shown in FIGS. 1-3 has a valve housing 1 and a shutting wedge 3 which is displaceable in the housing 1 by means of a threaded spindle 2 in the direction of a longitudinal axis of the spindle. The shutting wedge 3 is shown in the left half of FIGS. 1 and 2 in a closed position and in the right half in an open position. The shutting wedge can be rubber-coated.

The housing 1 carries lateral inlet and outlet pipes 4 and 5 which have flanges and are provided for passage of the flow medium. The housing also has an upper inwardly extending housing edge 6 which limits an upper housing opening 7. The housing opening 7 has a contour which narrowly corresponds to the oval-like outer contour of the rounded shutting wedge 3, so that the shutting wedge can be introduced through the opening 7 into the housing formed as small as possible. A threaded part 8 of the spindle 2 is screwed into a spindle nut 9 which is inserted in the head of the shutting wedge 3 and extends in the open position of the valve completely into a cylindrical hollow chamber of the shutting wedge. The housing 1 is provided with longitudinal guiding strips 10 for guiding the shutting wedge 3. The guiding strips 10 engage in longitudinal grooves of the shutting wedge.

The upper opening 7 of the housing is closed by a cover 11 which has an inwardly curved sealing edge 12 engaging with the housing edge 6. The cover 11 has an outwardly extending pipe 13 provided with an inner thread. A locking screw 14 is screwed into the pipe 13. A supporting ring 15 is arranged between the locking screw 14 and the pipe 13 and has diametrically opposite supporting legs 16 which abut on large-surface abutment projections 17 of the edge 6 of the housing. Thereby upon tigthening of the locking screw 14, the cover 11 is pressed with its sealing edge 12 and an elastic sealing ring 18 inserted therein, against the edge of the housing from inside of the latter. The opening 7 has a smaller axis 19 and a greater axis 19'. The pipe 13 of the cover has an outer diameter which substantially corresponds to the width of the opening 7 in the direction of the smaller axis 19, and the locking screw 14 has inwardly a recess 20 for a collar 21 of the spindle. An outer thread 22 of the locking screw extends over the entire height of the pipe 13.

The pipe 13 is provided with two outwardly extending mounting cams 23 which are circumferentially offset relative to the point 19. The cover 11 is inserted into the housing and together with the pipe 13 so that the cams 23 pass through the longer size of the opening 7. Then it is turned by 90° and pulled upwardly until abutment against the edge 6 of the housing as shown in FIGS. 1 and 3. For holding the cover 11 by means of the holding cams 23, both supporting legs 16 are formed with a curved cross-section and carry in their lower region inwardly projecting guiding strips 24 which engage the holding cams 23. The supporting legs 16 are provided at the end of a guiding path 25 formed by the guiding strips 24, with holding end abutments 26 for holding cams 23. Moreover, the cover 11 carries in the region of the holding end abutments 26 projections 27 for securing the supporting legs 16 from turning. The projections 27 lie higher than supporting surfaces 28 of the supporting legs 16 when the cover 11 is clamped.

The curved sealing edge 12 of the cover 11 has a circumferential trapezoidal groove 29 which together with a circumferential inclined projection 30 of the edge 6 of the housing forms a continuous closed sealing chamber for the elastic sealing ring 18. The elastic sealing ring 18 is formed as a standing sealing band with two edges which before deformation of the ring have the shape of beads 31 and 32. Abutment strips 33 of the sealing edge 12 which outwardly limit the trapezoidal groove 29 fix the elastic deformation of the sealing ring 18. A central part 34 of the cover 11 which forms a bottom of the pipe 13 is arranged in the cover offset in direction of curving of the sealing edge 12.

The locking screw 14 is coated in the region of a spindle guide 35 and a spindle abutment 36 with a synthetic plastic layer 37 which possesses high sliding properties and is wear-resistant. The synthetic plastic layer 37 is formed by spraying-on and is thereby fixedly connected with the locking screw 14. By means of depressions 38 in the spindle guide 35 and the spindle abutment 36 it is reliably anchored in the metal. Annular grooves 39 are formed by spraying in the depressions 38 of the layer 37 within the spindle guide 35. The annular grooves 39 receive spindle sealing rings 40.

A sealing lip 41 is provided on the head of the locking screw 14 for protecting the outwardly extending end of the spindle 2. The lip 41 is formed by spraying on the layer 37. Moreover, the locking screw 14 is coated in the region of its outwardly located flange 42 with a synthetic plastic material sprayed thereon. The outer thread 22 of the locking screw 14 screwed into the pipe 13 is sealed by an inner sealing ring 43. In the clamped condition of the cover 11, the abutment surfaces 28 of the supporting legs 16 abut firmly against the abutment projections 17 of the edge 6 of the housing, the abutment strips 33 of the edge 12 of the cover abut from inside against the edge 6 of the housing, and a collar 44 of the locking screw 14 abuts against the supporting ring 15, whereas a small play 46 remains between the supporting ring 15 and an outer end surface 45 of the pipe 13 of the cover.

Figure 4:
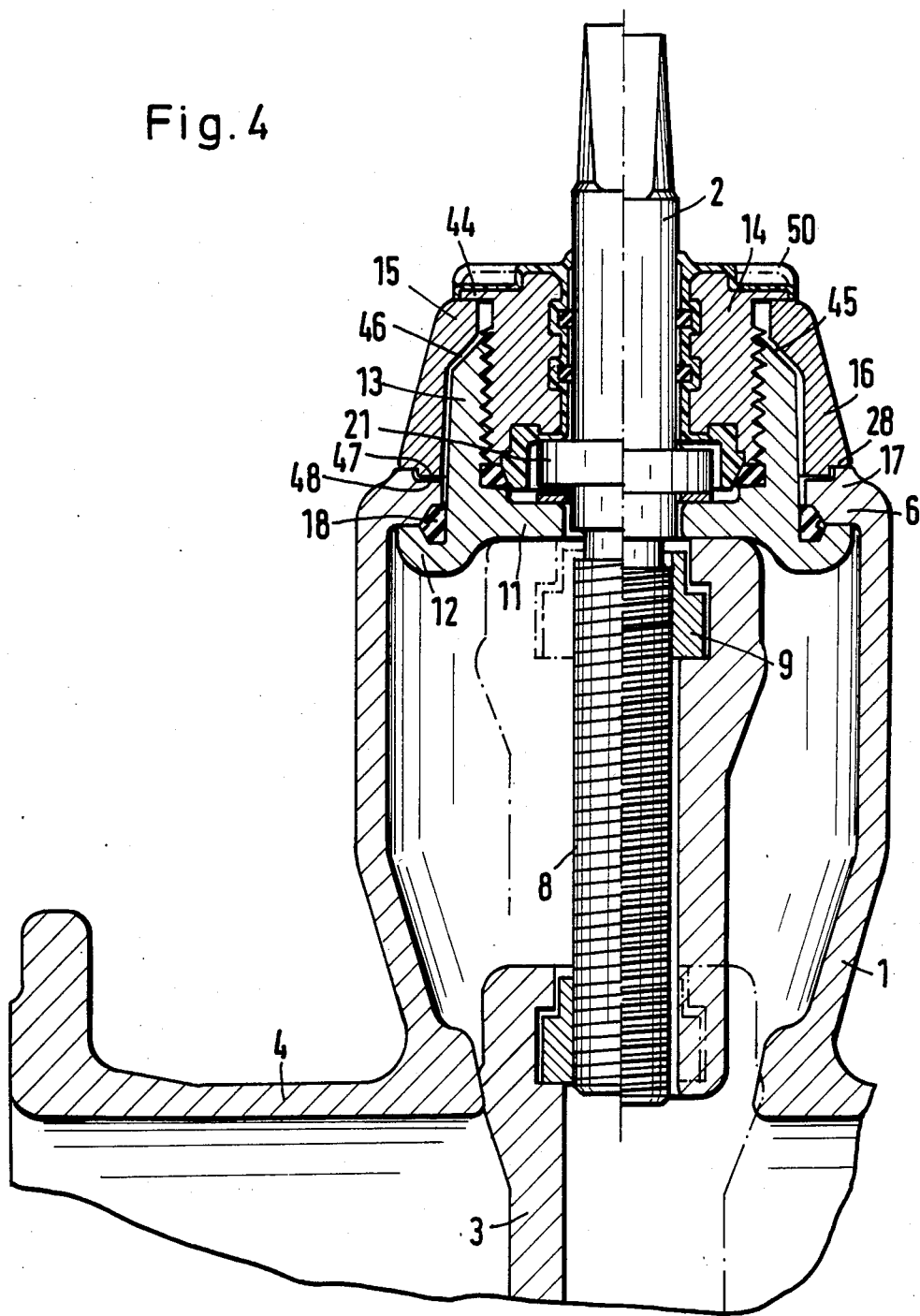
FIG. 4 is a view showing a shut-off valve in a section taken along the line IV—IV in FIG. 5, with a different construction and support for the supporting ring.
Figure 5:
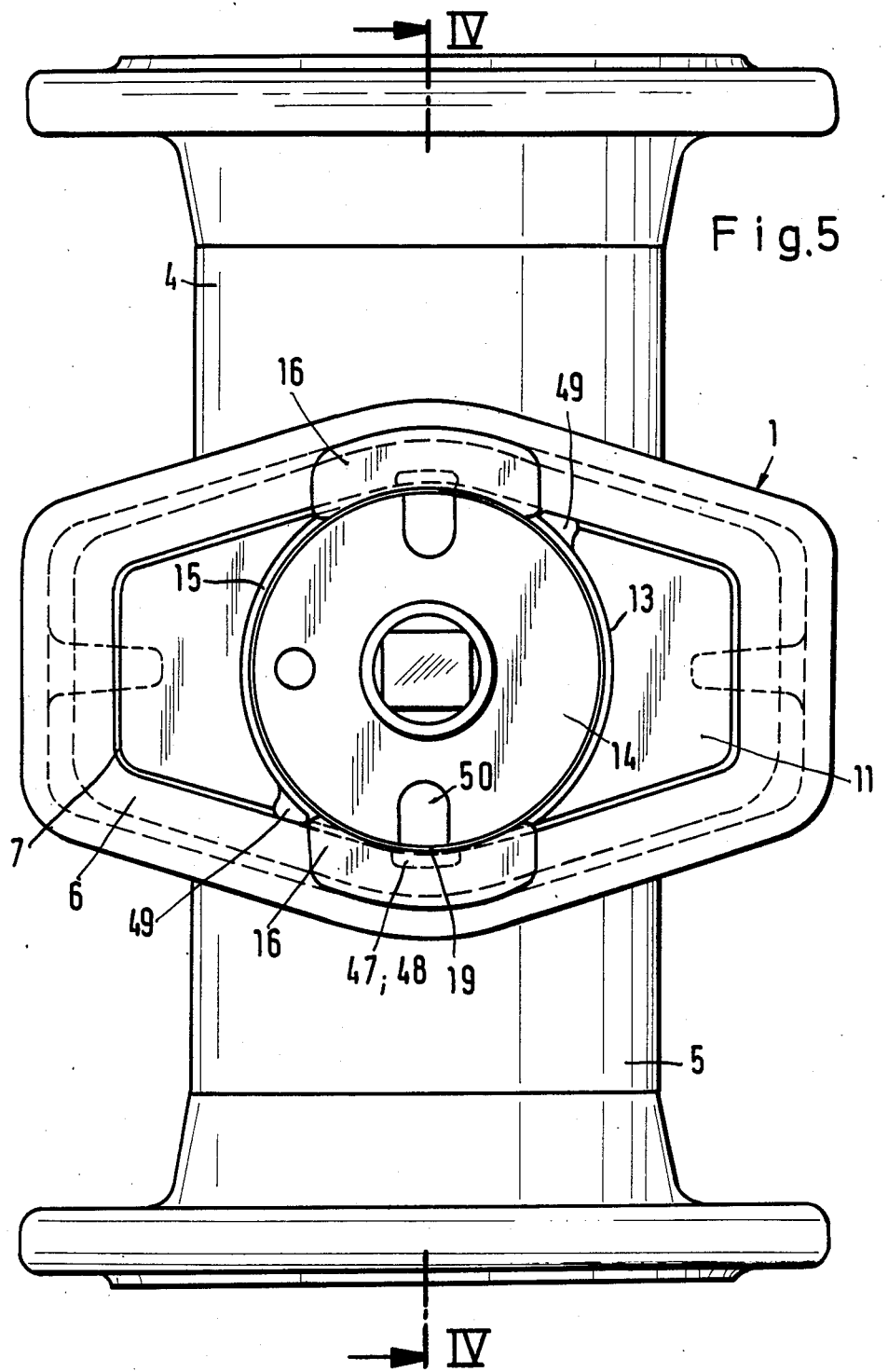
FIG. 5 is a plan view of the shut-off valve shown in FIG. 4.

In the embodiment shown in FIGS. 4 and 5 a somewhat different supporting ring 15 is arranged between the pipe 13 of the cover 11 and the collar 44 of the locking screw 14. In this construction the guiding paths of the supporting legs 16 and the holding cams of the pipe of the cover provided in the embodiment of FIGS.

1-3 can be dispensed with. For this purpose the supporting legs 16 are provided with lower arresting projections 47 which engage during mounting with arresting projections 48 of the edge 6 of the housing and form means for preventing rotation. Instead of the holding cams which are heavy to cast, the pipe 13 of the cover carries two diametrically opposite outer longitudinal ribs 49 which are circumferentially offset relative to the narrow point 19 of the opening 7 of the housing. The longitudinal ribs 49 extend over the entire height of the pipe 13. The arresting projections 47 of the supporting legs 16 and the cooperating arresting projections 48 of the housing edge can be seen in FIG. 4. On the plane view shown in FIG. 5, the supporting legs 16 lie over both interengaging parts 47 and 48. They cannot be seen there. Because of this, the projections and the counter projections 47, 48 are shown only in broken lines. Since these projections and counter projections 47, 48 extend only over a small part of the cross section of the supporting legs, the broken line is provided only in this cross section region. Since the cross section of the arresting projection 48 corresponds to the cross section of the arresting projection 47, these parts overlap one another on the view from above and therefore only one broken line can be seen.

During mounting of the valve, after insertion of the shutting wedge 3 and introduction of the cover 11 with the pipe 13, the supporting ring 15 is inserted with the supporting legs 16 which are circumferentially offset by 90° through the opening 7 into the housing 1. Then the threaded spindle 2 is screwed-in and the locking screw 14 is screwed by only several convolutions of the thread into the pipe 13 of the cover 11. Now the locking screw 14 with the parts thereon can be lifted, the supporting ring 15 is turned until abutment of the supporting legs 16 against the longitudinal ribs 49 of the pipe 13 by 90°, and finally the locking screw 14 is somewhat lowered. Thereby the supporting surfaces 28 of the supporting legs 16 abut completely against the edge 6 of the housing and all parts are supported by the supporting ring.

Since during lowering of the locking screw 14 the arresting projections 47 of the supporting legs 16 engage in the arresting projections 48 of the edge 6 of the housing, turning of the supporting ring 15 is reliably prevented. By this supporting ring suspension there are free hands for screwing in of the locking screw 14 till the clamping position. The final tensioning of the locking screw 14 is performed by a tightening key insertable into both recesses 50. Outer longitudinal ribs 49 of the pipe 13 are arranged so that the supporting legs 16 lie in the end position centrally relative to the narrow point 19 of the opening 7 of the housing. For providing a large-surface abutment against the edge 6 of the housing, the supporting legs 16 have an arcuate cross-section and the size of the arc is so great that it substantially corresponds to the inner size of the opening 7 in the inserted position of the supporting ring in the housing.

Figure 6:
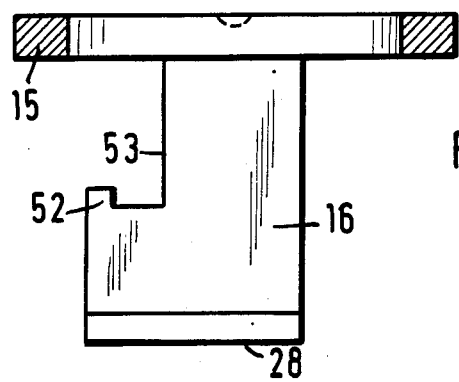
FIG. 6 is a view showing a further embodiment of the supporting ring, in a longitudinal section.
Figure 7:
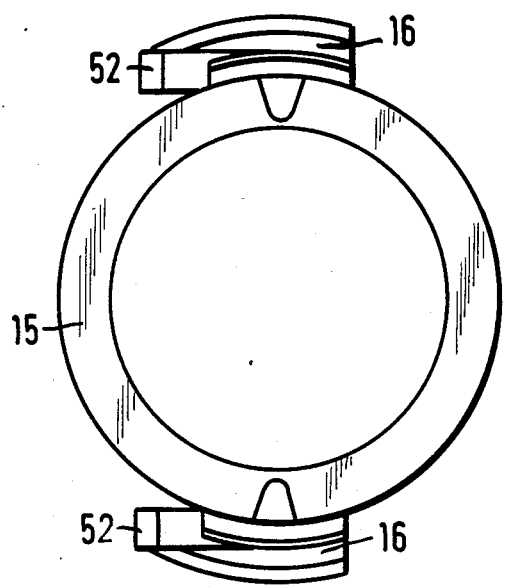
FIG. 7 is a plan view of the supporting ring in accordance with FIG. 6.
Figure 8:
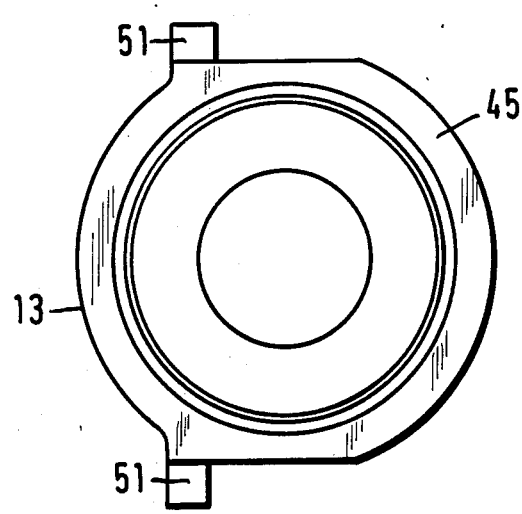
FIG. 8 is a plan view of a cover pipe for the supporting ring in accordance with FIGS. 6 and 7.

FIGS. 6-8 show a further possibility of constructing the supporting ring. In deviation from the embodiment of FIGS. 1-3, two holding cams 51 are provided on the pipe 13 of the cover, but both are offset toward the same side on the pipe 13. The supporting legs 16 of the supporting ring 15 carry holding hooks 52 facing toward the same side and engaging both holding cams 51 so as to fix the cover 11 during mounting. The introduced cover 11 is lifted with the aid of the pipe 13 and the supporting ring 15 is displaced with the supporting legs 16 from the side in direction of the greater axis of the oval opening 7 of the housing to a holding abutment 53 under the holding cam 51 of the pipe 13. In this position the supporting surfaces of the supporting legs 16 abut against the abutment projections 17 of the edge 6 of the housing, so that free hands remain for turning-in of the spindle 2 and the subsequent screwing-in of the locking screw 14. The holding cams 51 are arranged offset out of the center on the pipe 13 so that during pulling up of the cover 11 they can pass freely through the opening 7 of the housing. The holding cams 51 which are arranged on the cover pipe 13 at both sides project outwardly as shown in FIG. 8, so that the supporting legs 16 of the supporting ring 15 with their holding hooks 52 can be displaced under the cams 51 of the pipe 13. During mounting the supporting ring 15 with both supporting legs 16 is set from above against the housing, so that the supporting surfaces 28 abut against both small sides of the housing edge. Now the preliminarily inserted cover 11 can be grasped by the pipe 13 and pulled upwardly so that the holding hook 52 can be displaced under the cams 51. In this position the pipe 13 with the cover 11 hangs on the supporting legs 16 of the supporting ring 15, and the hands of the user are released for mounting the threaded spindle 8 and the locking screw 14. After turning-in of the locking screw 14, the pipe 13 with the cover 11 is pressed against the housing edge, so that the cams 51 of the pipe 13 move upwardly and disengage from the holding hooks 52 of the supporting legs 16.

It will be understood that each of the elements described above, or two or more together, may also find a useful application in other types of constructions differing from the types described above.

While the invention has been illustrated and described as embodied in a shut-off valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shut-off valve, comprising a housing defining an interior; means defining a flow direction through said housing; a displaceable spindle having a spindle collar; a shutting wedge displaceable in said spindle in said housing and extending in a direction which is transverse to the flow direction, said shutting wedge having an oval-like outer contour; a housing edge extending radially inwardly of said housing and defining an upper housing opening which has a contour substantially corresponding to the contour of said shutting wedge; a cover pressure-tightly closing said housing opening and having a sealing edge displaced downward into said interior of said housing and underlapping said housing edge from said interior of said housing, said cover being provided with an outwardly extending pipe having an outer end surface, said housing edge having a region adjacent to said pipe; a locking screw inserted in said pipe and forming a spindle guide, a spindle sealing and an abutment for said spindle collar, said locking screw having a collar in alignment with said outer end surface of said pipe of said cover, said pipe of said cover having an inner thread, said locking screw having an outer thread engaging with said inner thread of said pipe of said cover; and a supporting ring arranged between said outer end surface of said pipe of said cover and said collar of said locking screw, said supporting ring being provided with two opposite supporting legs which extend outwardly of said pipe and downwardly to said housing edge, said supporting legs having downwardly facing supporting surfaces which abut from above against said region of said housing edge, said supporting legs of said supporting ring having a large-area arcuate cross section, said edge of said housing being provided in the region of said supporting surfaces of said supporting legs with large-area flat abutment projections, said locking screw during tightening clamping said collar of said spindle and outwardly sealing said spindle, and at the same time clamping said cover with said housing.

2. A shut-off valve as defined in claim 1, wherein said shutting wedge is rubber-coated.

3. A shut-off valve as defined in claim 1, wherein said housing opening has smaller and greater axes and a predetermined width in direction of said smaller axis, said pipe of said cover having an outer diameter substantially corresponding to the width of said housing opening, said locking screw being provided inside with a recess for supporting said collar of said spindle and being provided outside with said outer thread which extends over its entire height.

4. A shut-off valve as defined in claim 1, wherein said sealing edge of said cover has an endless recess, said edge of said housing having an endless recess, said recesses of said sealing edge of said cover and said edge of said housing together forming a closed sealing chamber; and further comprising an elastic sealing ring located in said sealing chamber.

5. A shut-off valve as defined in claim 4, wherein said elastic sealing ring is formed as a standing sealing band provided with two edge beads, said sealing edge of said cover having an abutment strip which abuts against said edge of said housing.

6. A shut-off valve as defined in claim 1, wherein said locking screw is composed of metal and has a region for guiding said spindle and a region for supporting said collar of said spindle, said locking screw being provided in said regions with a wear-resistant synthetic plastic layer having high sliding properties.

7. A shut-off valve as defined in claim 6, wherein said spindle is provided with sealing rings, said synthetic plastic layer being provided with annular grooves for accommodating said sealing rings of said spindle.

8. A shut-off valve, comprising a housing defining an interior; means defining a flow direction through said housing; a displaceable spindle having a spindle collar; a shutting wedge displaceable in said spindle in said housing and extending in a direction which is transverse to the flow direction, said shutting wedge having an oval-like outer contour; a housing edge extending radially inwardly of said housing and defining an upper housing opening which has a contour substantially corresponding to the contour of said shutting wedge, said housing opening having smaller and greater axes; a cover pressure-tightly closing said housing opening and having a sealing edge displaced downward into said interior of said housing and underlapping said housing edge from said interior of said housing, said cover being provided with an outwardly extending pipe having an outer end surface, said housing edge having a region adjacent to said pipe; a locking screw inserted in said pipe and forming a spindle guide, a spindle sealing and an abutment for said spindle collar, said locking screw having a collar in alignment with said outer end surface of said pipe of said cover; and a supporting ring arranged between said outer end surface of said pipe of said cover and said collar of said locking screw and being turnable-in, said supporting ring being provided with two opposite supporting legs which extend outwardly of said pipe and downwardly to said housing edge, said supporting legs having downwardly facing supporting surfaces which abut from above against said region of said housing edge, said locking screw during tightening clamping said collar of said spindle and outwardly sealing said spindle, and at the same time clamping said cover with said housing, said pipe of said cover being provided with mounting means formed as two diametrically opposite outwardly projecting holding cams which extend inside a contour of said housing opening and are circumferentially offset relative to said smaller axis of said housing opening, said supporting legs having guiding strips which engage said holding cams during turning-in of said supporting ring.

9. A shut-off valve as defined in claim 8, wherein said supporting legs of said supporting ring are provided at the end of a guiding path with a holding abutment for said holding cams of said pipe of said cover, said cover carrying in the region of said holding abutment projections formed so as to prevent rotation of said supporting legs and engage said lower supporting surfaces of said supporting legs in a clamped position.

10. A shut-off valve, comprising a housing defining an interior; means defining a flow direction through said housing; a displaceable spindle having a spindle collar; a shutting wedge displaceable in said spindle in said housing and extending in a direction which is transverse to the flow direction, said shutting wedge having an oval-like outer contour; a housing edge extending radially inwardly of said housing and defining an upper housing opening which has a contour substantially corresponding to the contour of said shutting wedge; a cover pressure-tightly closing said housing opening and having a sealing edge displaced downward into said interior of said housing and underlapping said housing edge from said interior of said housing, said cover being provided with an outwardly extending pipe having an outer end surface, said housing edge having a region adjacent to said pipe; a locking screw inserted in said pipe and forming a spindle guide, a spindle sealing and an abutment for said spindle collar, said locking screw having a collar in alignment with said outer end surface of said pipe of said cover; and a supporting ring arranged between said outer end surface of said pipe of said cover and said collar of said locking screw, said supporting ring being provided with two opposite supporting legs which extend outwardly of said pipe and downwardly to said housing edge, said supporting legs having downwardly facing supporting surfaces which abut from above against said region of said housing edge, said locking screw during tightening clamping said collar of said spindle and outwardly sealing said spindle, and at the same time clamping said cover with said housing, said supporting legs having holding hooks provided with holding abutments, said pipe of said cover having mounting means formed as two opposite outwardly extending holding cams located inside a contour of said housing opening and off-centrally offset to the same side, said holding hooks of said supporting legs engaging with said holding cams during lateral insertion of said supporting ring.

11. A shut-off valve, comprising a housing defining an interior; means defining a flow direction through said housing; a displaceable spindle having a spindle collar; a shutting wedge displaceable in said spindle in said housing and extending in a direction which is transverse to the flow direction, said shutting wedge having an oval-like outer contour; a housing edge extending radially inwardly of said housing and defining an upper housing opening which has a contour substantially corresponding to the contour of said shutting wedge, said housing opening having a narrow location; a cover pressure-tightly closing said housing opening and having a sealing edge displaced downward into said interior of said housing and underlapping said housing edge from said interior of said housing, said cover being provided with an outwardly extending pipe having an outer end surface, said housing edge having a region adjacent to said pipe; a locking screw inserted in said pipe and forming a spindle guide, a spindle sealing and an abutment for said spindle collar, said locking screw having a collar in alignment with said outer end surface of said pipe of said cover; a supporting ring arranged between said outer end surface of said pipe of said cover and said collar of said locking screw, said supporting ring being provided with two opposite supporting legs which extend outwardly of said pipe and downwardly to said housing edge, said supporting legs having downwardly facing supporting surfaces which abut from above against said region of said housing edge, said locking screw during tightening clamping said collar of said spindle and outwardly sealing said spindle, and at the same time clamping said cover with said housing, said pipe of said cover having mounting means including at least one outer longitudinal rib located inside a contour of said housing opening circumferentially offset relative to the latter and extending over the entire height of said pipe to prevent rotation of said supporting legs of said supporting ring, said supporting legs being provided in the region of said supporting surfaces with arresting projections; and arresting projections provided in the region of said narrow location of said housing opening and engaging with said arresting projections of said supporting legs during mounting.

12. A shut-off valve as defined in claim 11, wherein said mounting means of said pipe include two such longitudinal ribs arranged diametrically opposite relative to one another.

13. A shut-off valve as defined in claim 11, wherein said further arresting projections are formed on said edge of said housing.

14. A shut-off valve as defined in claim 11, wherein said further arresting projections are provided on said cover.

* * * * *